United States Patent
Dwyer et al.

(10) Patent No.: US 11,358,846 B1
(45) Date of Patent: Jun. 14, 2022

(54) LEVEL COMPENSATOR

(71) Applicant: Amazon Technologies, Inc., Seattle, WA (US)

(72) Inventors: James Patrick Dwyer, Maple Valley, WA (US); Raul A. Passarini, Edgewood, WA (US); Eli Douglas Girod, Seattle, WA (US); Roland J. Menassa, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 16/939,818

(22) Filed: Jul. 27, 2020

(51) Int. Cl.
| | |
|---|---|
| *B66F 9/08* | (2006.01) |
| *B66F 9/00* | (2006.01) |
| *B65G 1/02* | (2006.01) |
| *B65G 47/34* | (2006.01) |
| *B66F 9/18* | (2006.01) |
| *B65G 47/14* | (2006.01) |

(52) U.S. Cl.
CPC ............... *B66F 9/08* (2013.01); *B65G 47/14* (2013.01); *B65G 47/34* (2013.01); *B66F 9/18* (2013.01)

(58) Field of Classification Search
CPC ..... B66F 9/00; B66F 9/08; B66F 9/18; B65G 1/02; B65G 47/14; B65G 47/34
See application file for complete search history.

(56) References Cited

U.S. PATENT DOCUMENTS

| | | | | | |
|---|---|---|---|---|---|
| 4,088,232 | A | * | 5/1978 | Lilly | B65G 1/0464 294/65.5 |
| 5,190,427 | A | * | 3/1993 | Lai | B65G 1/0478 414/236 |
| 9,701,490 | B2 | * | 7/2017 | Morency | B65G 47/905 |
| 9,845,208 | B2 | * | 12/2017 | Lindbo | B65G 59/063 |
| 10,287,112 | B2 | * | 5/2019 | Saylor | B65B 11/045 |
| 10,336,540 | B2 | * | 7/2019 | Gravelle | B65G 1/0464 |
| 10,703,564 | B2 | * | 7/2020 | Hognaland | B65G 1/0478 |
| 10,781,043 | B1 | * | 9/2020 | Kalm | B65G 1/0478 |
| 11,072,494 | B2 | * | 7/2021 | Hognaland | B65G 1/0464 |
| 2020/0324971 | A1 | * | 10/2020 | Ingram-Tedd et al. | |
| 2021/0299704 | A1 | * | 9/2021 | Bell et al. | |

* cited by examiner

*Primary Examiner* — Douglas A Hess
(74) *Attorney, Agent, or Firm* — Kilpatrick Townsend & Stockton LLP (57) ABSTRACT

A level compensator system may be configured to receive containers of different heights and position them at the same level. The level compensator system can include engagement platforms for engaging with the containers. The engagement platforms can move between an engagement configuration for engaging with the containers and a conveyance configuration for conveying of the containers relative to the level compensator.

19 Claims, 7 Drawing Sheets

LEVEL COMPENSATOR

BACKGROUND

Modern inventory systems, such as those in mail order warehouses, supply chain distribution centers, airport luggage systems, and custom-order manufacturing facilities, face significant challenges in responding to requests for inventory items. For requests that contain multiple inventory items, the items must be collected from a storage area, grouped together, and transferred to a packaging area for shipping. In some existing approaches, items with different dimensions are grouped together and moved at the same time. However, items with different dimensions may need to be handled differently, as using a technique that is safe for one item may cause another item to sustain damage while being grouped or transported.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container management system for moving and managing containers or other items. The techniques described herein may be implemented by any sorting system, but particular examples described herein include a level compensator for receiving containers of varying sizes. The containers may be received from a robotic manipulator that simultaneously engages the tops of the containers along a shared plane, for example. The level compensator can include moveable engagement platforms that can move between various engagement positions (e.g., different heights) for engaging with the bottoms of the containers. Thus, when the robotic manipulator releases the containers, the level compensator may prevent drops of differing amounts that could otherwise result due to differences in container sizes. The engagement platforms can move downward to another plane at a reduced altitude or otherwise shift the containers into a conveyance configuration from which the containers can be readily conveyed off of the level compensator, for example, using a pusher, driven rollers, or other conveyance device.

Turning now to a particular example, in this example, the container management system can include a level compensator with engagement platforms that can receive containers in an engagement configuration and move to a conveyance configuration for conveyance of the containers off of the level compensator. A manipulation assembly can retain a plurality of containers (for example, containers of varying sizes) and position the containers above the level compensator. The engagement platforms can be moved to the engagement configuration for engaging with the containers. For example, in the engagement configuration the engagement platforms can be at varying vertical engagement positions to engage with the bottoms of the containers that may be positioned at different vertical positions. The engagement platforms can reach the varying vertical engagement positions by being displaced downwardly as the manipulation assembly lowers or by rising to meet the container bottoms, for example. The engagement platforms can engage with the containers and move to the conveyance configuration. In the conveyance configuration, the bottoms of the containers can be positioned along a single vertical position. For example, in the conveyance configuration the bottoms of the containers may be at the same level. With the engagement platforms in the conveyance configuration, the containers can be conveyed off of the level compensator. For example, a pusher, driven roller, or other conveyance device can convey the containers off of the level compensator.

While exemplary embodiments are described with reference to containers and container sorting systems, and the like, the systems and techniques described herein are also applicable to any other items and/or suitable packaging containers (e.g., bags, boxes, totes, envelopes, pouches, sacks, jugs, and other similar containers).

Figure 1:
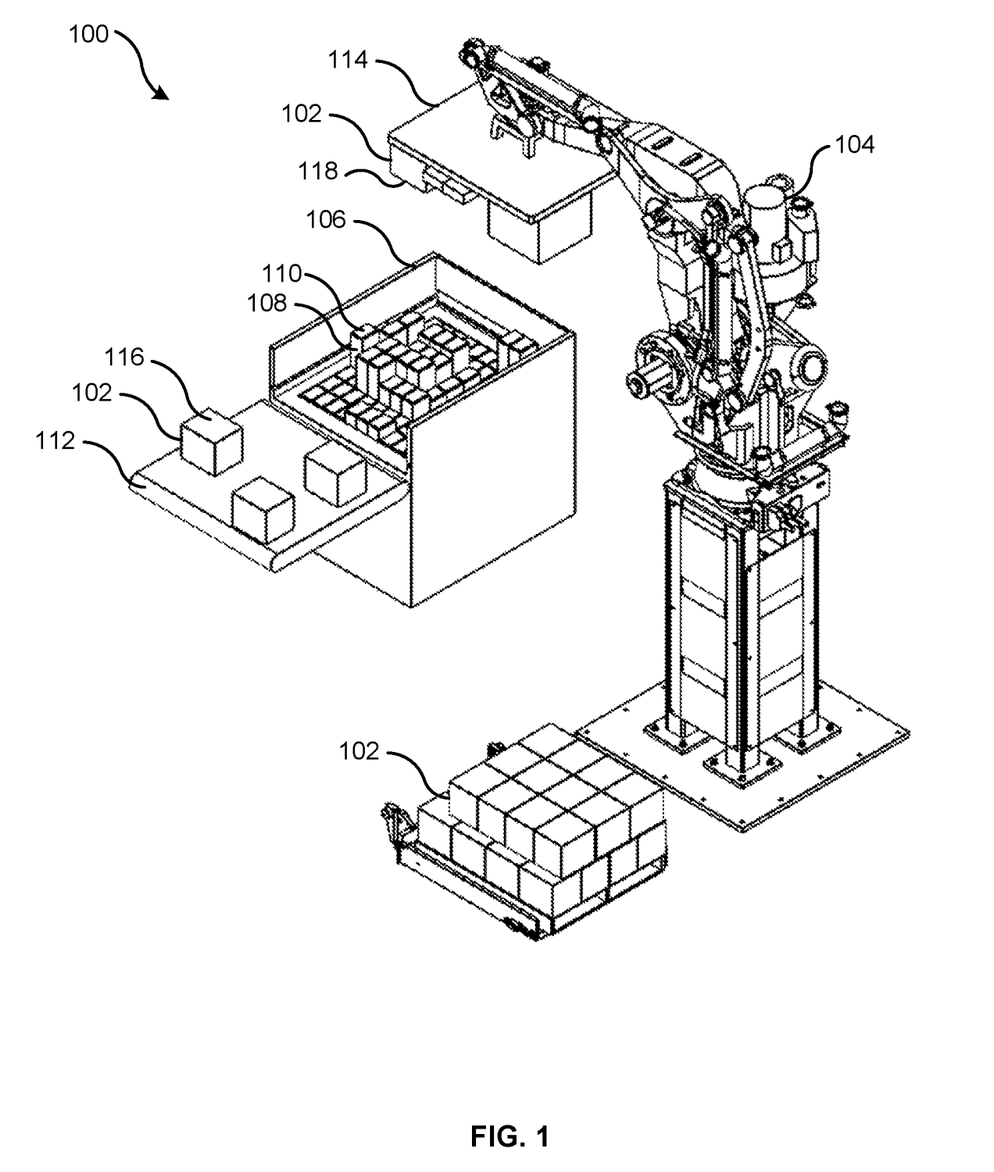
FIG. 1 illustrates a container management system for moving and managing containers, in accordance with embodiments.

Turning now to the figures, FIG. 1 illustrates a container management system 100, in accordance with embodiments, for moving and managing containers 102. The container management system 100 can be positioned in a warehouse environment, for example, in a warehouse environment where containers 102 are being moved, sorted, and/or stored. The container management system 100 can include a robotic manipulator 104 for retaining and positioning the containers 102 above a level compensator 106. For example, the robotic manipulator 104 can pull from a pallet and retain containers 102 and move them to a position above the level compensator 106. The level compensator 106 can include one or more engagement platforms 108 for receiving the containers 102. The engagement platforms 108 can include engagement surfaces 110 for engaging with the containers 102. The engagement platforms 108 can move independently between an engagement configuration and a conveyance configuration. In the engagement configuration, the engagement platforms 108 can be positioned at one or more vertical engagement positions to receive containers 102 on the engagement surfaces 110. For example, the engagement platforms 108 can be raised or lowered to meet or position the bottoms of the containers along multiple horizontal planes. In the conveyance configuration, the engagement platforms 108 can position the containers 102 for conveyance off of the level compensator 106. For example, the engagement platforms 108 can position the bottoms of the containers 102 along a single horizontal plane. In various embodiments, the containers 102 can be conveyed off of level compensator 106 and onto the conveyor 112. The conveyor 112 can convey the containers 102 to another location, for example, another location in the warehouse environment.

The containers 102 can be or include a container or a bin with an interior area for containing one or more items. The containers 102 can include a top side 116 and an opposing bottom side 118. The top side 116 can engage with the robotic manipulator 104 (e.g., when the containers are being conveyed). The bottom side 118 can engage with the engagement surfaces 110 and/or the conveyor 112. For example, the engagement surfaces 110 can engage with bottom sides 118 of the containers 102 and position the containers 102 for transfer relative to the conveyor 112 (e.g., onto or off of) and/or for conveyance by the conveyor 112. The containers 102 may include rigid or semi-rigid material, for example, plastic, cardboard, paper, or any suitable material for containing items. In some embodiments, the containers 102 can include handles, hooks, engagement surfaces, suctionable surfaces, or other features and/or components for engaging with the engagement platforms 108 and/or with other elements of the container management system 100. In further embodiments, the containers 102 may be items, e.g., such that the items are moved by the container management system 100 without first being positioned in a container 102.

The robotic manipulator 104 can be or include a robotic device that can engage with and move containers 102. The robotic manipulator 104 can correspond to any suitable structure for moving containers 102. Examples, can include, but are not limited to, conveyors, belts, rollers, chains, bands, robotic arms, or other conveyance devices. In various embodiments, the robotic manipulator 104 can be or include a robotic arm moveable along multiple axes. However, the robotic manipulator 104 may be or include any suitable robotic device, for example, a mobile drive unit and/or unmanned aerial vehicle.

The robotic manipulator 104 can include a retention surface 114 for retaining the containers 102 during movement of the robotic manipulator 104. For example, the retention surface 114 can retain the containers 102 during movement between an area in the warehouse environment and the level compensator 106. The retention surface 114 can retain the containers 102 along a first surface (e.g., a top surface) of the containers. The retention surface 114 can be include, or be included in one or more devices for attaching to the containers 102 (e.g., a vacuum device, a suction device, and/or any suitable device for attaching to containers 102).

The conveyor 112 can be or include an output conveyor for transporting of the containers 102. The conveyor 112 can be positioned at a height that is generally level with the engagement surfaces 110 when the engagement platforms 108 are in the conveyance configuration. However, the conveyor 112 may be at a height lower than the height of the engagement surface 110 when the engagement platforms 108 are in the conveyance configuration. The conveyor 112 can receive the containers 102 from the level compensator 106 and move the containers to another location (e.g., another location in the warehouse environment). The conveyor 112 can be or include any suitable structure for moving the containers 102. The conveyor 112 can include, but is not limited to, rollers, chains, motor driven rollers, belts, bands, robotic arms, and/or other components suitable for moving containers 102.

Figure 2A:
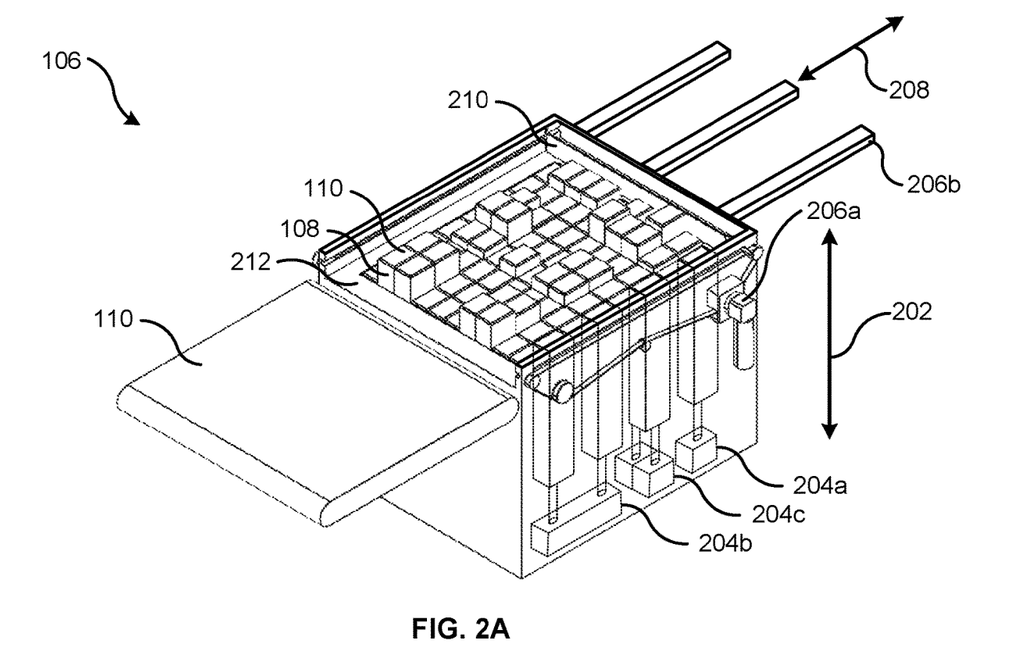
FIG. 2A illustrates an example level compensation assembly that can be included in particular embodiments of the container management system of FIG. 1.

FIG. 2A illustrates an example level compensator 106 that can be included in particular embodiments of the container management system 100 of FIG. 1. The level compensator 106 can include engagement platforms 108 (e.g., pogos and/or any suitable platform that can be moved), with each engagement platform 108 having an engagement surface 110. For example, the engagement surface 110 may be an uppermost surface of the engagement platform 108. The engagement platforms 108 can be arranged in a grid pattern for engagement with the containers 102 (as described below in reference to FIG. 2B). The engagement platforms 108 can move along direction 202 (e.g., a vertical direction) between the engagement configuration and the conveyance configuration. In the conveyance configuration, the engagement platforms 108 can be positioned to generally align the engagement surfaces 110 with a conveyance surface 212. In the engagement configuration, the engagement platforms 108 can be positioned with the engagement surfaces 110 positioned above the conveyance surface 212. For example, the engagement surfaces 110 can be generally aligned above the conveyance surface 212. In some embodiments, the engagement platforms 108 may be positioned with the engagement surfaces 110 at a variety of heights above the conveyance surface 212.

In various embodiments, the engagement platforms 108 can be positioned at a ready configuration prior to moving the engagement platforms 108 to the engagement configuration. In the ready configuration, the engagement platforms 108 can be positioned with the engagement surfaces 110 generally aligned along a first horizontal plane (e.g., generally aligned with the conveyance surface 212) and can be moved upwards along direction 202 until the engagement surfaces 110 engage with respective containers 102. The engagement surfaces 110 can engage with respective containers 102 at various vertical positions that can correspond to various horizontal planes (e.g., at various vertical heights above the conveyance surface 212). In some embodiments, in the ready configuration, the engagement platforms 108 can be positioned with the engagement surfaces 110 aligned along a horizontal plane that is at a vertical position above the conveyance surface 212. The engagement platforms 108 can be moved to the engagement configuration by being moved downward along direction 202. For example, the containers 102 can engage with the engagement surfaces 110 and the robotic manipulator 104 can push the containers 102 down onto the engagement surfaces 110 to move the engagement platforms downward to the engagement configuration.

The engagement platforms 108 can be moved along direction 202 (e.g., upward or downward) by one or more actuators 204. The actuators 204 can attached with and move the engagement platforms 108 to various vertical engagement positions along direction 202. For example, the actuators 204 can extend the engagement platforms 108 upward along direction 202 until the engagement surfaces 110 engage with containers 102 and stop the movement of the engagement platforms 108 when resistance to the movement is encountered. The actuators 204 can additionally or alternatively allow for movement of the engagement platforms 108 downward along direction 202 by the containers 102 being pressed into the engagement surfaces 110. Any suitable ratio or relationship between engagement platform 108 and actuator 204 can be utilized, including, but not limited to, examples such as an individual engagement platform 108 being attached to a single actuator 204a, a single actuator 204b being attached to multiple engagement platforms 108, and/or multiple actuators 204c being attached to a single engagement platform 108.

The engagement surfaces 110 can be sized and shaped for engagement with one or more containers 102. For example, the engagement surface 110 can have a surface area that corresponds to a surface area of one side of a container 102. However, the engagement surface 110 may have a surface area that is a portion (e.g., half) of the surface area of one side of a container 102. The engagement surfaces 110 can have the same size and shape as one another, however, there may be multiple different sizes and shapes of the engagement surfaces 110. In various embodiments, the containers 102 may have multiple sizes and the engagement surface 110 may be sized based on the size of the smallest container 102. For example, the engagement surface 110 may have an area that is less than or equal to the surface area of one side of the smallest container 102. In some embodiments, the engagement surface 110 can be or include a rolling and/or friction reducing surface (or other feature that facilitates movement of the containers 102 to slide or otherwise move onto or off of the level compensator 106). For example, the engagement surface 110 can be or include silicone, a non-stick surface, a ball bearing, a roller, and/or another feature for counteracting friction otherwise facilitating movement.

One or more conveyance devices 206 (shown by way of example as devices 206a and 206b in FIG. 2A) can convey the containers 102 laterally. For example, the conveyance devices 206 can convey the containers 102 onto, off of, and/or relative to the level compensator 106. The conveyance device 206 can convey the containers 102 when the engagement platforms 108 are in the conveyance configuration. The conveyance devices 206 can move along direction 208 for conveyance of the containers 102. For example, direction 208 may be aligned in a horizontal plane or may be otherwise oriented perpendicular or non-parallel to direction 202. The conveyance devices 206 can include a sled 210 for engaging with and pushing the containers 102 off of the level compensator 106. The sled 210 can be or include resilient material (e.g., metal) that can engage with the containers 102. A first conveyance device 206a can include one or more arms that can move along direction 208 and are attached to sled 210. The arms can move sled 210 along direction 208 the entire length of the level compensator 106. For example, the arms can extend to move the sled 210 for conveyance of the containers 102 off of the level compensator and retract the sled 210 to a standby position. A second conveyance device 206b can include a continuous loop system that moves sled 210 along direction 208. The continuous loop system can include a motor and a belt and/or chain that is attached to the sled 210. The continuous loop can move sled 210 along direction 208 to convey the containers 102 off of the level compensator 106 and retract the sled 210 to the standby position. In various embodiments, the level compensator 106 includes one of the conveyance devices 206, however, the level compensator 106 may include both conveyance devices 206. In such embodiments, the conveyance devices 206 may work together (e.g., each inputs less force than it would otherwise need working alone), however, the conveyance devices 206 may work independently from one another.

Figure 2B:
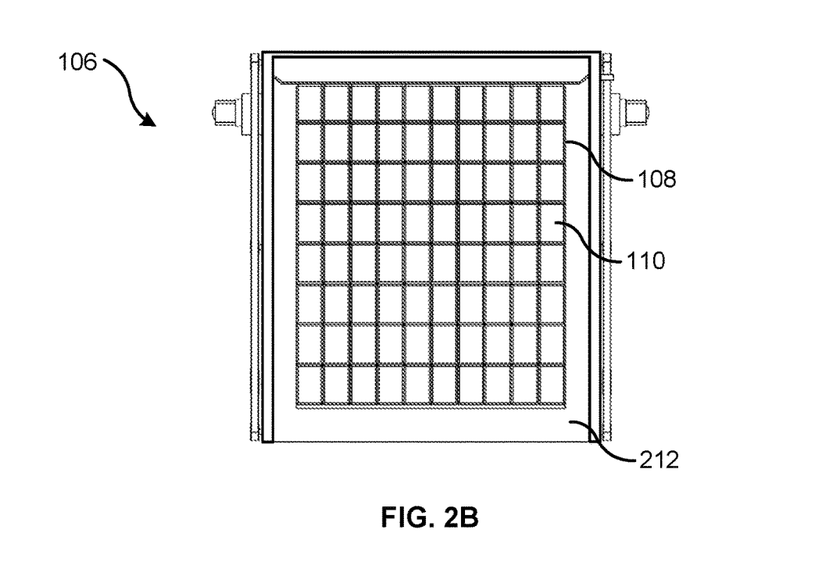
FIG. 2B is a top view of a portion of the level compensation assembly of FIG. 2A.

FIG. 2B is a top view of a portion of the level compensator 106 of FIG. 2A showing an arrangement of the engagement platforms 108. The engagement platforms 108 can be arranged in a grid pattern. Each of the engagement platforms 108 of the grid can be independently moved to engage with containers 102. The grid pattern can allow for multiple engagement surfaces 110 to engage with containers 102. For example, a container 102 can be positioned at an intersection of multiple engagement platforms 108 that can be raised to the same vertical engagement height to engage with and support the container 102.

Figure 3A:
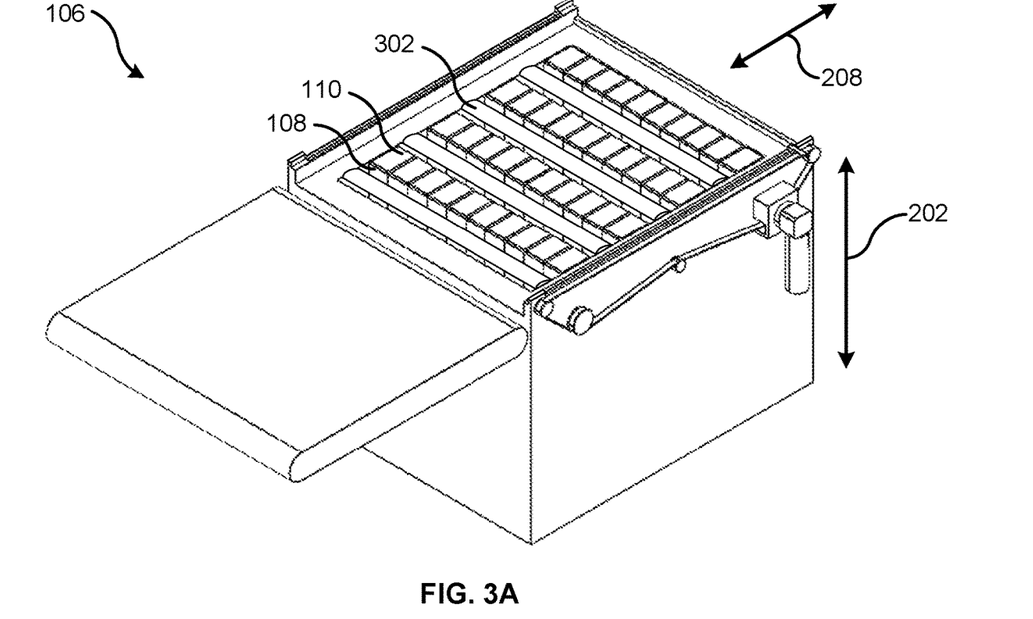
FIG. 3A illustrates an additional example level compensation assembly that can be included in particular embodiments of the container management system of FIG. 1.

Turning to FIG. 3A, an additional example of the level compensator 106 that can be included in particular embodiments of the container management system of FIG. 1 is shown. The level compensator 106 can include engagement platforms 108 and motor driven rollers 302. The motor driven rollers 302 can convey the containers 102 along direction 208. For example, the motor driven rollers 302 can convey the containers 102 off of the level compensator 106 when the engagement platforms 108 are in the conveyance configuration. The motor driven rollers 302 allow for conveyance of the containers 102 without using a sled 210 and/or a similar device.

In embodiments of the level compensator 106 with the motor driven rollers 302, the engagement surfaces 110 may have a smaller area than they would have in embodiments without the motor driven rollers 302. However, the engagement surfaces 110 may have the same area regardless of whether there are motor driven rollers 302.

Figure 3B:
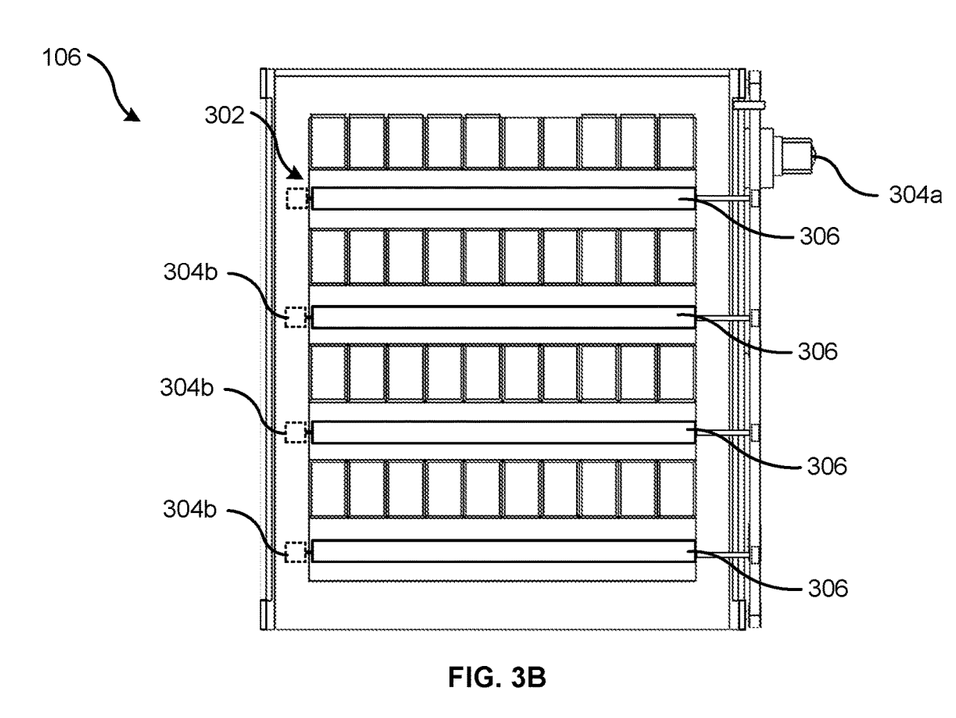
FIG. 3B is a top view of a portion of the level compensation assembly FIG. 3A.

FIG. 3B is a top view of a portion of the level compensator 106 including motor driven rollers 302 shown in FIG. 3A. The motor driven rollers 302 can be positioned between rows of the engagement platforms 108. The motor driven rollers 302 can be spaced apart such that when the engagement platforms 108 are in the conveyance configuration the containers 102 are in contact with at least one of the motor driven rollers 302. The motor driven rollers 302 can be driven by one or more motors 304. For example, multiple motor driven rollers 302 can be driven by a single motor 304a. Additionally or alternatively, a given motor driven roller 302 can be driven by a given single motor 304b. The motors 304 can drive the roller 306 which can engage with a surface of containers 102 (e.g., a bottom surface) to convey the containers off of the level compensator 106. The motor driven rollers 302 can be or include a material that can engage with the containers 102 (e.g., with the bottom sides 118). For example, the motor driven rollers 302 can be or include rubber and/or a another material with suitable gripping properties to facilitate engagement with the containers 102.

Figure 4A:
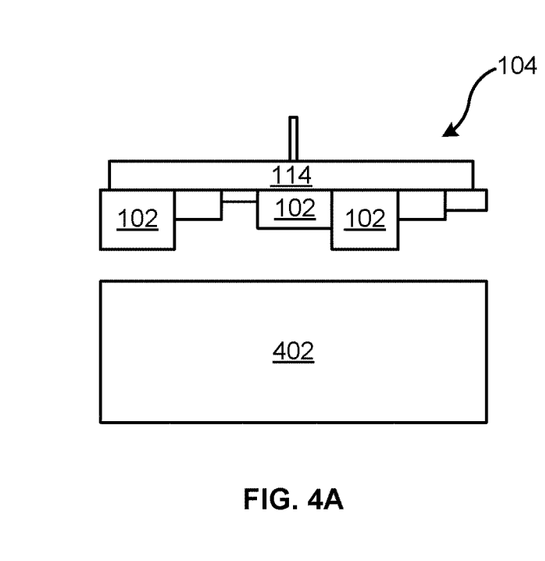
FIGS. 4A through 4C illustrate a process for moving and managing containers using known components.
Figure 4B:
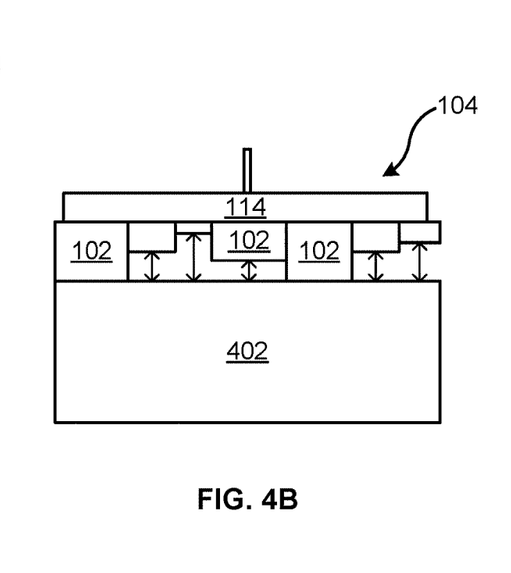
Figure 4C:
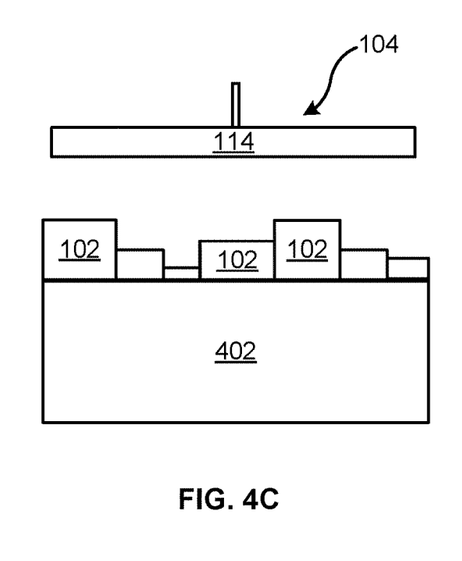

Turning to FIGS. 4A through 4C, a process for moving and managing containers 102 using known components is illustrated. FIG. 4A shows the containers 102 retained and positioned above an offload surface 402 using, for example, robotic manipulator 104. The containers 102 can be retained by retention surface 114 along a first surface (e.g., a top surface). The containers 102 can have various heights and extend away from the retention surface 114 different distances. FIG. 4B shows the containers positioned on offload surface 402. The bottoms of the tallest containers 102 are engaged with the offload surface 402 while the bottoms of the shorter containers 102 are suspended by the retention surface 114 above the offload surface 402 at varying distances graphically represented by double-headed arrows. FIG. 4C shows that the retention surface 114 can disengage from the containers 102, causing the shorter containers to fall onto the offload surface 402 (e.g., from the distances depicted by double-headed arrows in FIG. 4B). The fall can cause damage to the containers 102 and/or items contained in the containers 102, especially when the distance between the containers and the offload surface 402 is large and/or there are fragile and/or sensitive items in the containers 102.

Figure 5:
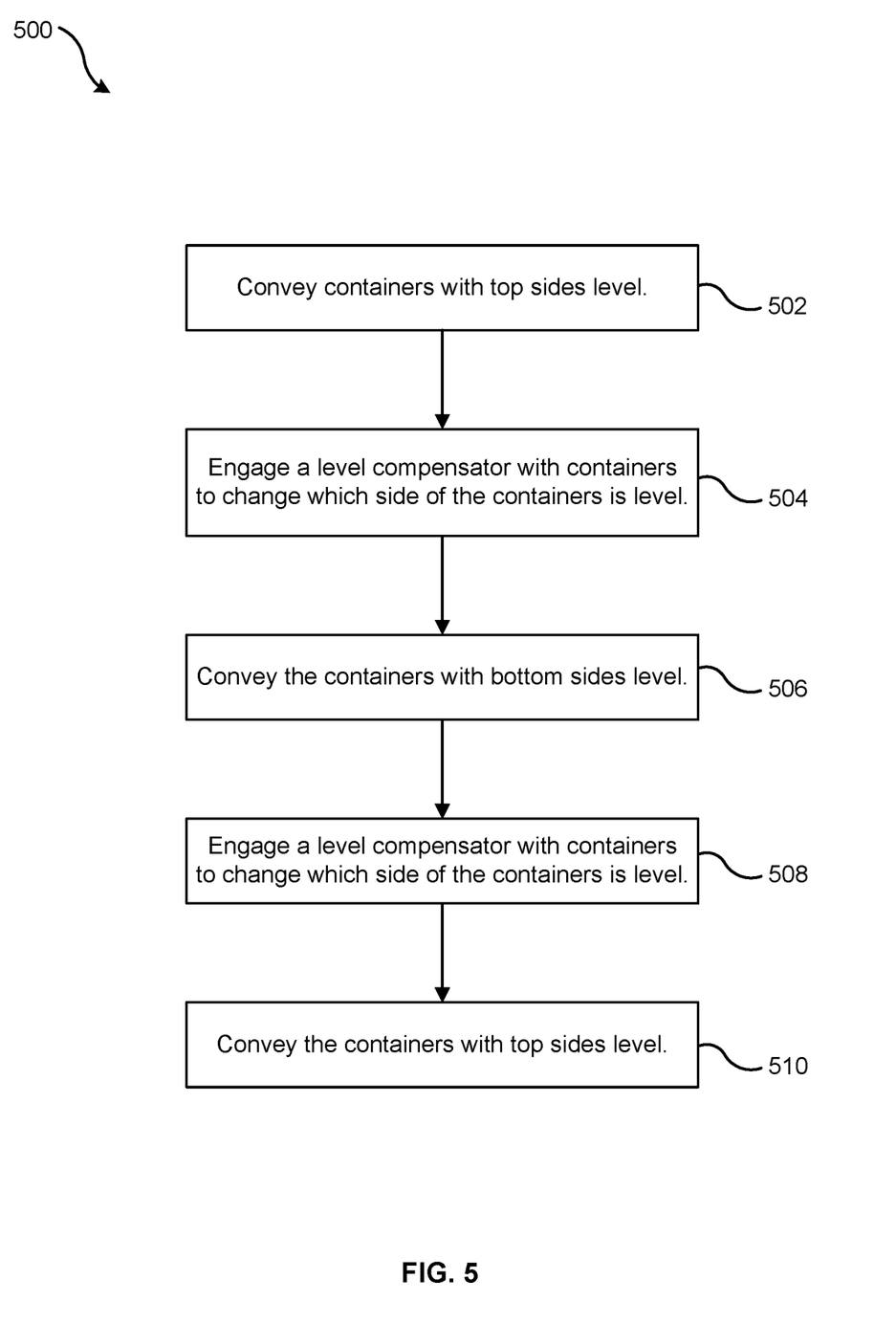
FIG. 5 illustrates a flowchart illustrating a process for moving containers using the container management system of FIG. 1.

To reduce and/or prevent damage to the containers 102 and/or items in the containers, the container management system 100 of FIG. 1 can be used. FIG. 5 illustrates a flowchart illustrating a process 500 for moving containers using the container management system 100 of FIG. 1. Various blocks of the process 500 are described by referencing the components shown in FIGS. 6A through 7F, however, additional and/or alternative components may be used with the process 500. Moreover, although the process 500 is described below in terms that may be relevant to drop-off scenarios as well as pick-up scenarios, relevant portions of the process 500 and associated components may be utilized for handling drop-off scenarios alone, pick-up scenarios alone, or a combination of drop-off and pick-up scenarios.

Figure 6A:
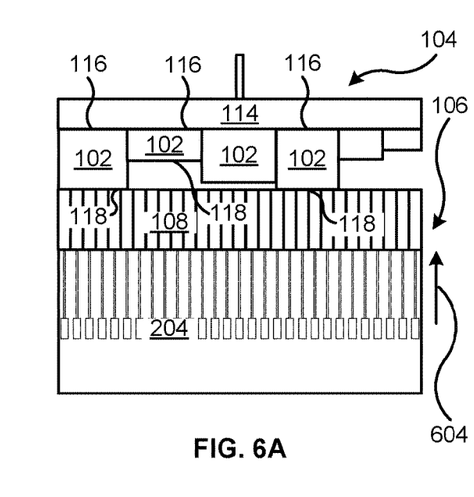
FIGS. 6A through 6F illustrate various states of components that may be implemented in a simplified example process for depositing and receiving one or more containers that can be used with particular embodiments of the container management system of FIG. 1.
Figure 7A:
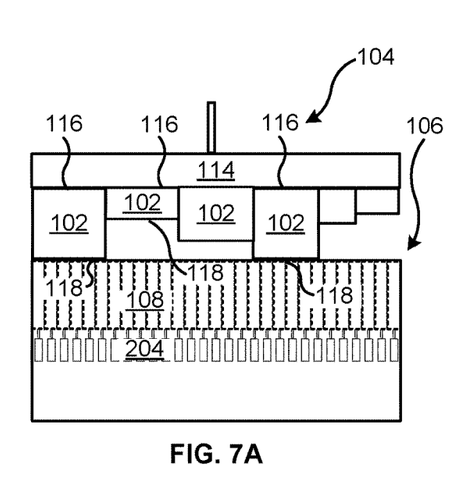
FIGS. 7A through 7F illustrate various states of components that may be implemented in a simplified example process for depositing and receiving one or more containers that can be used with particular embodiments of the container management system of FIG. 1.

The process 500 at block 502 can include conveying containers (e.g., containers 102) with first sides (e.g., top sides 116) level. FIGS. 6A and 7A illustrate the containers 102 being conveyed with the top sides 116 level (e.g., generally aligned along a plane, which may be a horizontal plane). The containers 102 can have the top sides 116 level for engagement with a robotic manipulator (e.g., robotic manipulator 104). The robotic manipulator 104 can engage the top sides 116 of the containers 102 with retention surface 114 (e.g., retention surface 114 can be a planar surface with engagement mechanisms for engaging with the top sides 116) and position the containers 102 above the level compensator 106. The level compensator 106 can include engagement platforms 108.

FIG. 6A shows a ready configuration of the engagement platforms 108. To reach the ready configuration, the engagement platforms 108 can be positioned at a vertical engagement height above the conveyance surface 212 (e.g., moved in direction 604 to the vertical engagement height above the conveyance surface 212) for receiving the containers 102. In various embodiments, the engagement platforms 108 can be positioned at a vertical engagement height above the conveyance surface 212 that is, for example, approximately the same as or greater than the height of the tallest container 102. The engagement platforms 108 can be positioned in the ready configuration using actuators 204. FIG. 7A shows an alternative ready configuration of the engagement platforms 108. To reach the alternate ready configuration, the engagement platforms 108 can be positioned at a vertical position that is generally aligned with the conveyance surface 212. In some embodiments, in the alternate ready configuration the engagement platforms 108 can be positioned at a height above the conveyance surface 212, for example, a height that is less than or equal to the height of the shortest container 102. In the ready position or the alternate ready position the engagement surfaces 110 may engage with some, all, or none of the bottom sides 118 of the containers 102.

The process 500 at block 504 can include engaging the level compensator 106 with the containers 102, for example, to change which side of the containers 102 are level (e.g., changing from the top sides 116 of the containers 102 being level to the bottom sides 118 of the containers 102 being level). The engagement surfaces 110 of the engagement platforms 108 can engage with the containers 102 (e.g., the bottom sides 118 of the containers 102). The engagement surfaces 110 can start out engaging with some, all, or none of the bottom sides 118 of the containers 102. For example, as in each of FIGS. 6A and 7B, the bottom sides 118 of the taller containers 102 can engage with the engagement surfaces 110 while the shorter containers 102 can have a gap between the engagement surfaces 110 and the bottom sides 118 containers 102.

Figure 6B:
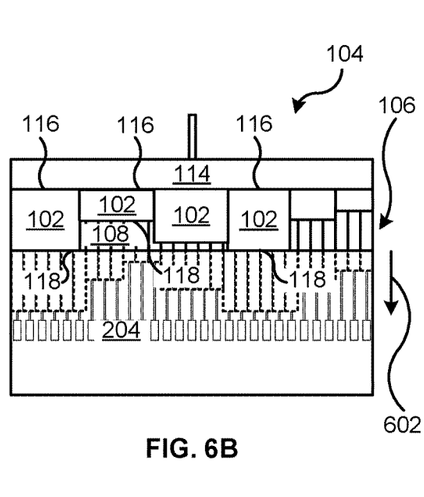
Figure 7B:
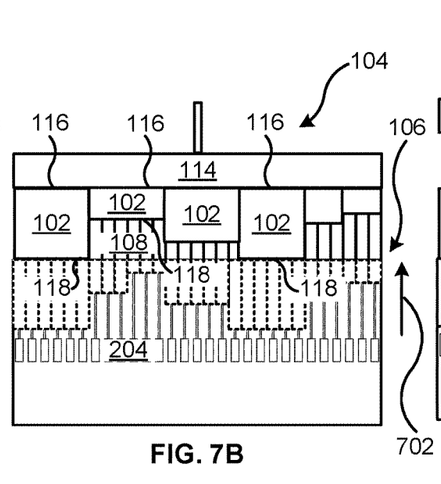

FIGS. 6B and 7B illustrate the level compensator 106 fully engaged with the containers 102. FIG. 6B shows a first engagement method for engaging with the containers 102. The containers 102 can engage with the extended engagement platforms 108 and the robotic manipulator 104 can be used to press the engagement platforms 108 downward (e.g., as illustrated by arrow 602 in FIG. 6B). The actuators 204 can provide resistance to the movement of the containers 102 to prevent the containers 102 from moving too rapidly. The containers 102 can push the engagement platforms 108 until the engagement surfaces 110 are positioned at a variety of vertical engagement positions. The vertical engagement position of the engagement surfaces 110 can depend on the height of the container 102 that the engagement surfaces 110 were engaged with. For example, the containers 102 can push the engagement platforms 108 downward until the tallest containers 102 have pushed the engagement platforms 108 into a fully retracted position while the shorter containers 102 may only push the engagement platforms 108 a portion of the way into the retracted position.

FIG. 7B shows a second engagement method for engaging with the containers 102. The engagement platforms 108 can extend upward (e.g., as illustrated by arrow 702) until the engagement surfaces 110 are engaged with the containers 102 (e.g., the bottom sides 118 of containers 102). The engagement platforms 108 can extend upwards using actuators 204. The actuators 204 can extend the engagement platforms 108 until the engagement surfaces 110 contact or otherwise engage with the bottom sides 118 of the containers 102. The engagement surfaces 110 engaging with the bottom sides 118 of the containers 102 can cause the actuators 204 to experience resistance which can be used to determine when the actuators 204 have extended the engagement platforms 108 far enough. The vertical position of the engagement surfaces 110 of the engagement platforms 108 can depend on the height of the containers 102. For example, the bottom sides 118 of the tallest containers 102 may already be engaged with the engagement surfaces 110 of engagement platforms 108 and those engagement platforms 108 would not need to extend, while other engagement platforms 108 can extend until the associated engagement surfaces 110 are engaged with the bottom sides 118 of the shorter containers 102.

In various embodiments, a computer system can control the engagement platforms 108 to extend upwards and engage with the bottom sides 118 of the containers 102. The computer system can use one or more sensors (e.g., optical, mechanical, infrared, heat, temperature, laser, and/or any suitable sensor) to determine when the engagement platforms 108 (e.g., the engagement surfaces 110) are engaged with the bottoms 118 of the containers 102. The engagement platforms 108 can be controlled to extend to various vertical positions to engage with the bottoms 118 of the containers 102. In some embodiments, the computer system can be or include machine vision to determine when the top engagement platforms 108 are engaged with the bottoms 118 of the containers 102.

The level compensator 106 can change which side of the containers 102 is level. For example, with the engagement platforms 108 engaged with the containers 102, the engagement platforms 108 can be lowered (e.g., as illustrated by arrow 602 in FIG. 6C and arrow 704 in FIG. 7C) until the bottom sides 118 of the containers 102 are level (e.g., generally aligned along the same plane, which may be a horizontal plane at a different elevation compared to a horizontal plane at which the top sides 116 of the containers 102 were arranged when engaged with the retention surface 114). Although in some embodiments, the engagement platforms 108 can be positioned at a variety of cascading heights to create a sloped surface (e.g., such that the bottom sides 118 of the containers 102 may be suitably positioned to slide down in a direction aligned along a tilted plane onto the conveyor 112 or into some other arrangement that can facilitate subsequent conveying of the containers 102 with the bottom sides 118 level), in many embodiments, the containers 102 can be lowered by the engagement platforms 108 until the bottom sides 118 of the containers 102 are generally level with the conveyance surface 212 (e.g., which may facilitate subsequent conveying of the containers 102 with the bottom sides 118 level, such as described below with respect to the process 500 at 508).

The process 500 at 508 can include conveying the containers 102 with bottom sides 118 level. For example, the containers 102 may be conveyed off of the level compensator 106 (e.g., as illustrated by arrow 606 in FIG. 6C and arrow 706 in FIG. 7C) with the bottom sides 118 level. The containers 102 can be conveyed off of the level compensator 106 using the conveyance device 206 and/or the motor driven rollers 302. The containers 102 can be conveyed off of the level compensator 106 and onto the conveyor 112. The conveyor 112 can then transport the containers 102 (e.g., to another location within or outside the warehouse environment). After and/or during conveyance of the containers 102 off of the level compensator 106, the engagement platforms 108 can be extended to be ready to engage with additional containers 102 (e.g., as shown in FIG. 6A) or can remain retracted (e.g., as shown in FIG. 7A).

In some embodiments, before, during, or after movement of the engagement platforms 108 to the conveyance configuration and/or conveyance of the containers 102 off of the level compensator 106, the robotic manipulator 104 can move away from the level compensator 106, for example, to a position for retaining additional containers 102. In general, the robotic manipulator 104 or retention surface 114 may move away from the level compensator 106 at any point after the level compensator 106 has engaged the containers 102. In some embodiments, after the containers 102 have been conveyed off of the level compensator 106 and/or while the robotic manipulator 104 is retaining additional containers 102, the engagement platforms 108 can be moved to the ready position, for example, to receive the additional containers 102.

Figure 6C:
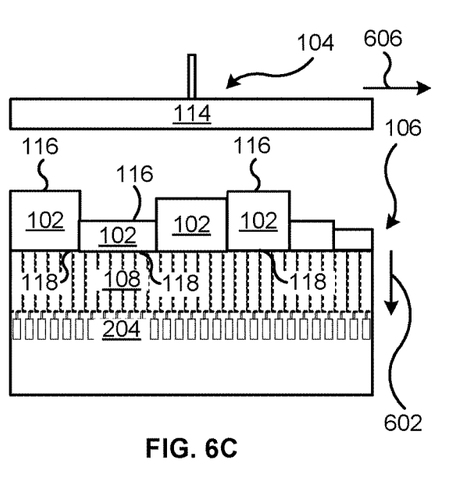
Figure 6D:
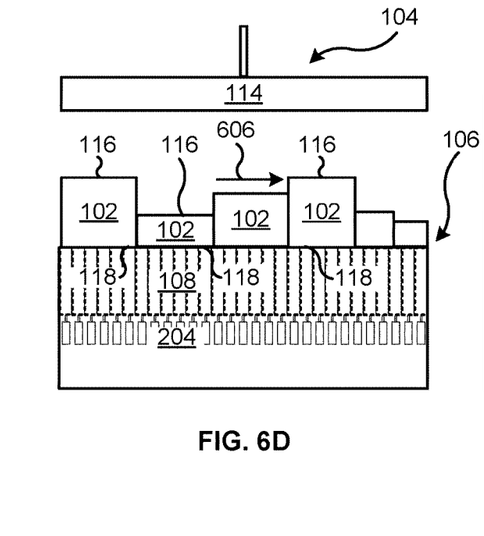

In addition to or as an alternative to facilitating drop-off scenarios, the process 500 may facilitate pick-up scenarios. In various embodiments, conveying the containers 102 with bottom sides 118 level at 506 can include conveying containers 102 onto the level compensator 106. As shown in FIGS. 6D and 7D the containers 102 can be conveyed onto the level compensator 106 with the engagement platforms 108 positioned in a retracted position (e.g., the containers 102 can be conveyed onto the level compensator 106 in direction 606 and 706 respectively). The bottom sides 118 can be level (e.g., generally aligned along the same plane) with the conveyance surface 212. The containers 102 can be conveyed onto the level compensator 106 with conveyor 112 or any other conveyance device (including, but not limited to, options described above with respect to conveyance devices 206).

The process 500 at 508 can include engaging the level compensator 106 with containers 102 to change which side of the containers 102 is level (e.g., changing from the bottom sides 118 of the containers 102 being level to the top sides 116 of the containers 102 being level). The engagement surfaces 110 of the engagement platforms 108 can engage with the bottom sides 118 of the containers 102, and the engagement platforms 108 can extend to raise the containers 102, for example, to a position for engaging the top sides 116 of the containers 102 with the robotic manipulator 104.

In some embodiments, the level compensator 106 can be arranged in a ready configuration prior to (or in the process of) changing which side of the containers 102 is level. In the ready position, the robotic manipulator 104 can engage with the containers 102 to aid in switching which side of the containers 102 is level. FIG. 6E shows a ready configuration of the engagement platforms 108. To reach the ready configuration, the engagement platforms 108 can be raised to position the containers 102 at a vertical engagement height above the conveyance surface 212 (e.g., the engagement platforms 108 can extend with the bottom sides 118 of the containers 102 level and position the bottom sides 118 of the containers 102 at a vertical height above the conveyance surface 212). In various embodiments, the engagement platforms 108 can be positioned at a vertical height above the conveyance surface 212 that is, for example, approximately the same as or greater than the height of the tallest container 102. The engagement platforms 108 can be moved using the actuators 204.

Figure 6E:
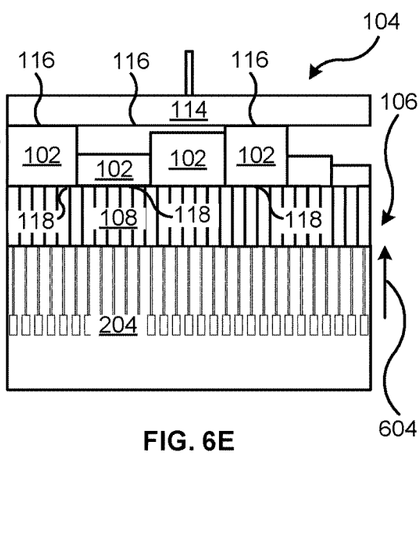
Figure 6F:
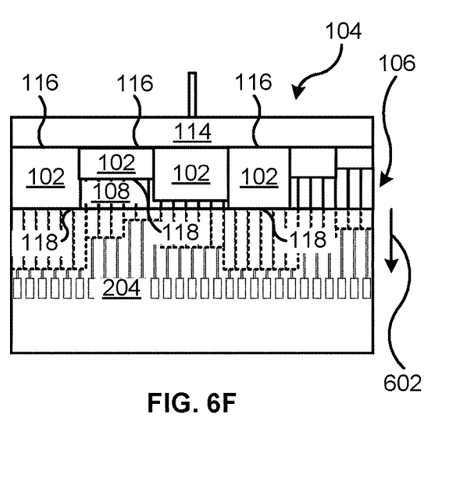
Figure 7C:
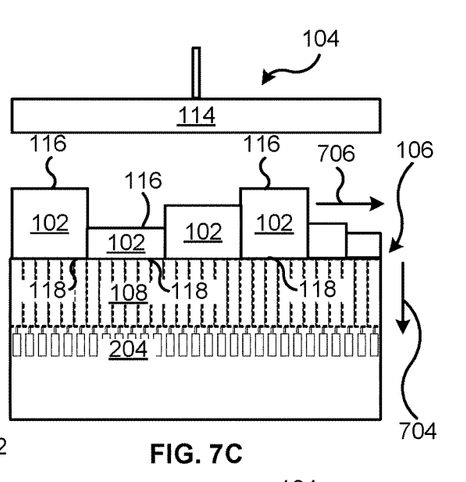
Figure 7D:
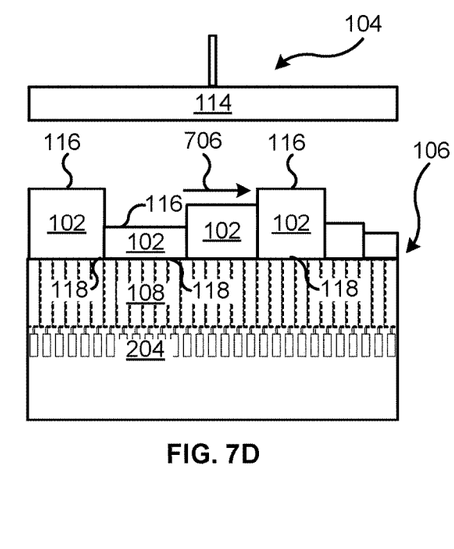
Figure 7E:
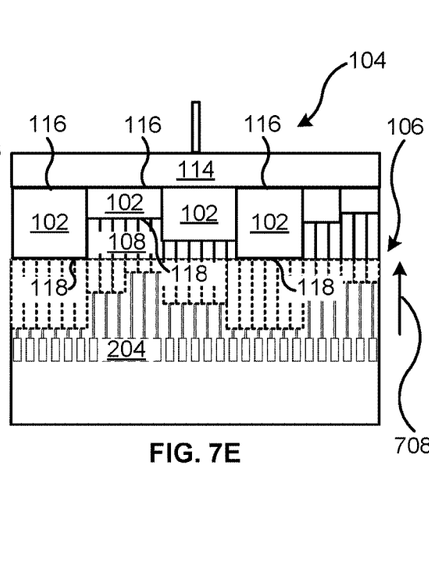

FIGS. 6F and 7E show the containers 102 with the top sides 116 level. The top sides 116 can be level to engage with the robotic manipulator 104 (e.g., to engage with the retention surface 114). FIG. 6F shows a first engagement method for engaging with the containers 102. With the engagement platforms 108 positioned in the ready configuration (e.g., with the engagement platforms 108 positioning the containers 102 with bottom sides 118 level at a vertical height above the conveyance surface 212, such as in FIG. 6E), the robotic manipulator 104 (FIG. 6F) can engage with the top sides 116 of the containers 102 and press the engagement platforms 108 downward (e.g., as illustrated by arrow 602 in FIG. 6F). The actuators 204 can provide resistance to the movement of the containers 102 to prevent the containers 102 form moving too rapidly. The robotic manipulator 104 can press the engagement platforms 108 downward until the top sides 116 of the containers 102 are level. The engagement platforms 108 can be pushed down a variety of distances to level the top sides 116 of the containers 102, for example, based on the height of the containers 102. For example, the tallest containers 102 can push the engagement platforms 108 downward until the tallest containers 102 have pushed the engagement platforms 108 into a fully retracted position while the shorter containers 102 may only push the engagement platforms 108 a portion of the way into the retracted position.

FIG. 7E shows a second engagement method for changing which side of the containers 102 is level. The containers 102 can be positioned on the engagement platforms 108 with the bottom sides 118 level and extend upward (e.g., as illustrated by arrow 708) until the containers 102 are engaged with the robotic manipulator 104 (e.g., the top sides 116 of the containers 102 are engaged with retention surface 114). The containers 102 engaging with the robotic manipulator 104 can cause the actuators 204 to experience resistance which can be used to determine when the actuators 204 have extended the engagement platforms 108 far enough to level the top sides 116 of the containers 102. The vertical position of the engagement platforms 108 can depend on the height of the containers 102. For example, the top sides 116 of the tallest containers 102 may already be engaged with the robotic manipulator 104 and those engagement platforms 108 would not need to extend, while other engagement platforms 108 can extend until the top sides 116 of the containers 102 are engaged with the robotic manipulator 104.

In various embodiments, a computer system can control the engagement platforms 108 to extend upwards until the top sides 116 of the containers 102 are level. The computer system can use one or more sensors (e.g., optical, mechanical, infrared, heat, temperature, laser, and/or any suitable sensor) to determine when the top sides 116 of the containers 102 are level. For example, the computer system can use the sensors to detect when the top sides 116 of the shorter containers 102 are level with the top sides 116 of the longer containers 102. In some embodiments, the computer system can be or include machine vision to determine when the top sides 116 of the containers 102 are level.

Figure 7F:
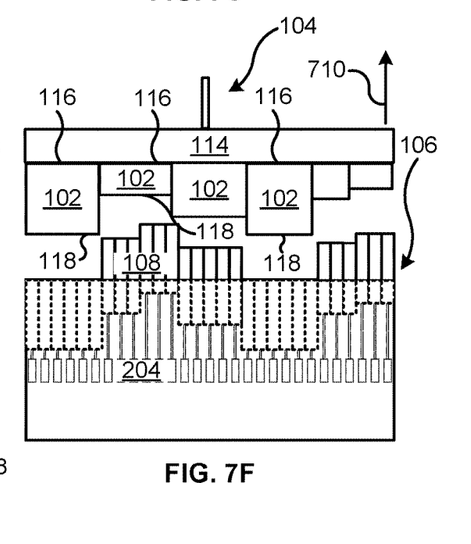

The process 500 at 510 can include conveying the containers with the top sides 116 level. The top sides 116 of the containers 102 can be level and engaged with the robotic manipulator 104 (e.g., the top sides 116 can be engaged with the retention surface 114 of the robotic manipulator 104). For example, after the top sides 116 of the containers 102 have been leveled (e.g., as shown in FIGS. 6F and 7E) the containers 102 can be conveyed by robotic manipulator 104 away from the level compensator 106. FIG. 7F shows the containers 102 with the top sides 116 level being conveyed away from the level compensator 106. The robotic manipulator 104 can convey the containers 102 away from the level compensator 106 to another location. For example, the robotic manipulator 104 can convey the containers 102 away from the level compensator 106 (e.g., in the direction indicated by arrow 710). In various embodiments, the containers 102 can be conveyed to conveyor 112. In some embodiments, the containers 102 may be conveyed to another level compensator 106.

In some embodiments, after the containers 102 have been conveyed off of the level compensator 106 and/or while the robotic manipulator 104 is conveying the containers 102, the engagement platforms 108 can be moved to a ready position, for example, to receive the additional containers 102. The ready position can include the engagement platforms 108 in a fully extended configuration, a fully retracted configuration, and/or a semi-retracted configuration in which the engagement platforms 108 are positioned at one or more vertical heights. For example, FIG. 7F shows the engagement platforms 108 in a semi-retracted configuration with the engagement platforms 108 positioned at various vertical heights.

In various embodiments, different combinations of ready configurations can be used (e.g., the figure series FIGS. 6A-6C can be combined with FIGS. 6D-6F and/or FIGS. 7D-7F and/or the figure series FIGS. 7A-7C can be combined with FIGS. 7D-7F and/or FIGS. 6D-6F). For example, containers 102 can be loaded onto the level compensator 106 using the method described in reference to FIGS. 6A through 6C and can be taken off of the level compensator 106 using the method described in reference to FIGS. 7D through 7F.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    operating a manipulation assembly to position containers above a level compensator, the level compensator comprising moveable engagement platforms, each of the engagement platforms having an engagement surface;
    engaging the containers with the engagement platforms arranged in an engagement configuration;
    with the engagement surfaces of the moveable engagement platforms engaged with the containers, operating actuators coupled with the engagement platforms to arrange the engagement platforms in a conveyance configuration; and
    with the engagement platforms in the conveyance configuration, conveying the containers off of the level compensator.

2. The method of claim 1, further comprising:
    with the engagement platforms in the conveyance configuration, conveying additional containers onto the level compensator;
    with the additional containers on the level compensator, operating at least the actuators coupled with the engagement platforms to arrange the engagement platforms in the engagement configuration;
    with the engagement platforms arranged in the engagement configuration, engaging the additional containers via the manipulation assembly at a position above the level compensator; and
    operating the manipulation assembly to retain the additional containers and move the additional containers away from the level compensator.

3. The method of claim 1, wherein conveying the containers off of the level compensator comprises operating a conveyance device to convey the containers off of the level compensator, and wherein the conveyance device comprises at least one of motor driven rollers, a sled coupled to extension arms configured to move the sled in a horizontal direction, or a moveable sled driven by a continuous belt coupled to a motor.

4. The method of claim 1, wherein in the conveyance configuration the engagement surfaces are positioned at a single vertical engagement position aligned along a horizontal plane.

5. The method of claim 1, wherein in the engagement configuration the engagement surfaces are arranged at two or more vertical engagement positions aligned along two or more horizontal planes.

6. The method of claim 1, wherein engaging the containers with the engagement platforms comprises, using the containers to apply a downwards force to the engagement platforms or extending the engagement platforms upwards toward the containers until the engagement surfaces are engaged with the containers.

7. A system, comprising:
    a container manipulator having a retention surface configured to engage with a plurality of containers on a first side, each of the containers having a second side opposing the first side;
    a level compensator comprising a plurality of engagement platforms, each of the engagement platforms having an engagement surface configured to engage with one or more containers of the plurality of containers at the second side; and
    actuators coupled with the engagement platforms and configured to move the engagement platforms between an engagement configuration and a conveyance configuration, wherein in the engagement configuration the engagement surfaces are positioned at one or more vertical engagement positions and the first sides of the plurality of containers are aligned along a first horizontal plane, and wherein in the conveyance configuration the engagement surfaces are positioned such that the second sides of the plurality of containers are aligned along a second horizontal plane that is at a lower vertical height than the first horizontal plane.

8. The system of claim 7, further comprising a conveyance device configured to engage with at least one of the plurality of containers and, with the engagement platforms in the conveyance configuration, convey the containers off of the level compensator.

9. The system of claim 8, wherein the conveyance device comprises at least one of a motor driven roller or a sled configured to convey the containers off of the level compensator.

10. The system of claim 7, wherein the actuators are further configured to retract the engagement platforms in response to force from the containers or extend the engagement platforms until the containers resist movement of the engagement platforms.

11. The system of claim 7, wherein the engagement platforms are arranged in a grid and are independently controllable.

12. The system of claim 7, wherein the engagement surfaces comprise a rolling or friction-reducing element for sliding the containers off of the engagement surfaces.

13. The system of claim 7, further comprising a delivery conveyor configured to receive and convey at least one of the plurality of containers relative to the level compensator.

14. A level compensator, comprising:
    a plurality of engagement platforms configured to move between a conveyance configuration in which the plurality of engagement platforms are configured to support containers with bottom sides aligned along a first horizontal plane and an engagement configuration in which the plurality of engagement platforms are configured to align top sides of the containers along a second horizontal plane at a higher vertical position than the first horizontal plane, each of the engagement platforms having an engagement surface positionable at one or more vertical engagement positions to engage with one or more containers of the containers; and
    actuators coupled with the engagement platforms and configured to move the engagement platforms between the engagement configuration and the conveyance configuration.

15. The level compensator of claim 14, comprising a conveyance device configured to, with the engagement platforms in the conveyance configuration, convey the containers off of or on to the plurality of engagement platforms.

16. The level compensator of claim 14, wherein in the engagement configuration, the top sides of the containers are aligned for engagement with a robotic manipulator to facilitate pick up or removal of the containers from the engagement platforms by the robotic manipulator.

17. The level compensator of claim 14, wherein in the engagement configuration the engagement surfaces are positioned at one or more vertical heights and in the conveyance configuration the engagement surfaces are positioned at a single vertical height.

18. The level compensator of claim 14, wherein the actuators are further configured to extend the engagement platforms prior to engagement with the containers and resist a downward force applied to the engagement platforms by the containers.

19. The level compensator of claim 14, wherein the actuators are further configured to extend the engagement platforms to engage with the containers until a resistance force is applied by the containers engaging with the engagement platforms.

\* \* \* \* \*